May 10, 1938.  A. G. F. WALLGREN ET AL  2,116,871
BEARING
Filed April 17, 1933   5 Sheets-Sheet 1

INVENTORS
BY
ATTORNEY

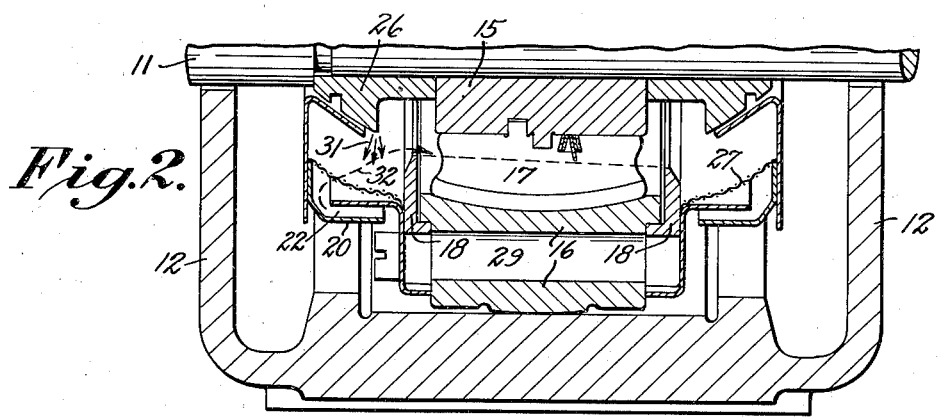
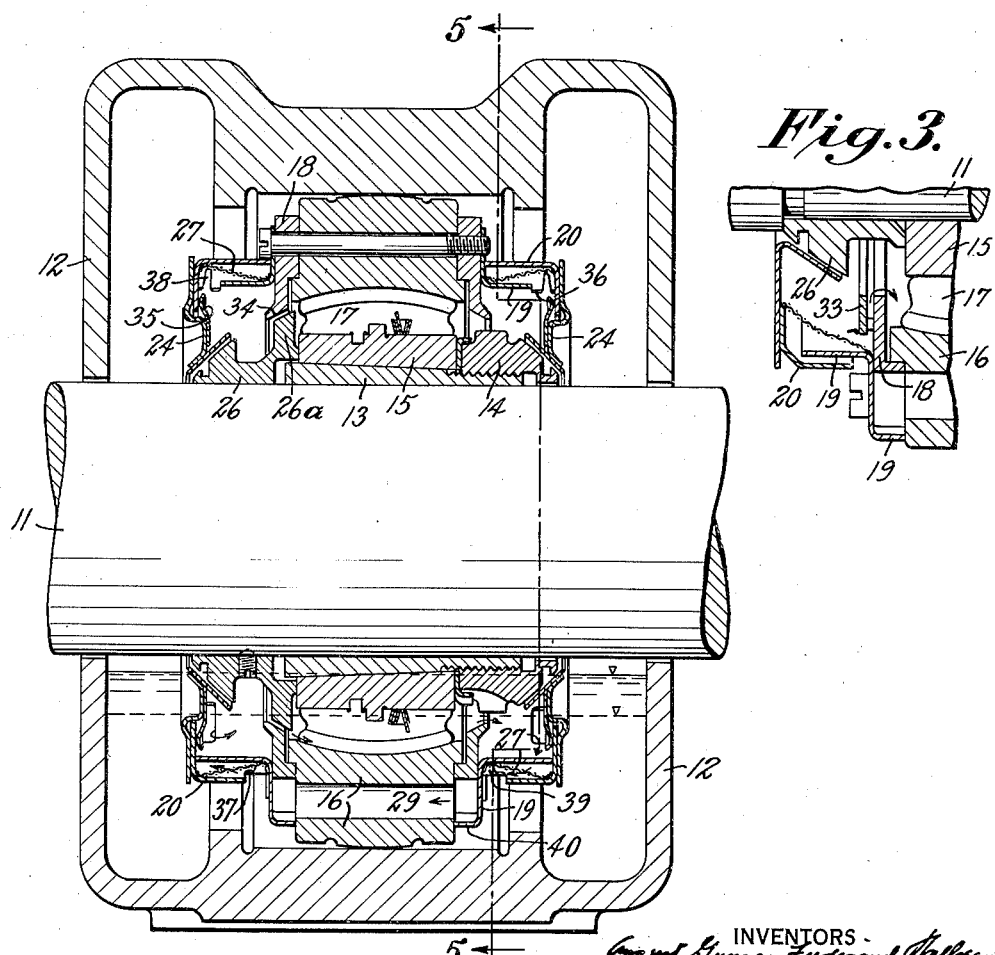

May 10, 1938.  A. G. F. WALLGREN ET AL  2,116,871
BEARING
Filed April 17, 1933   5 Sheets-Sheet 3
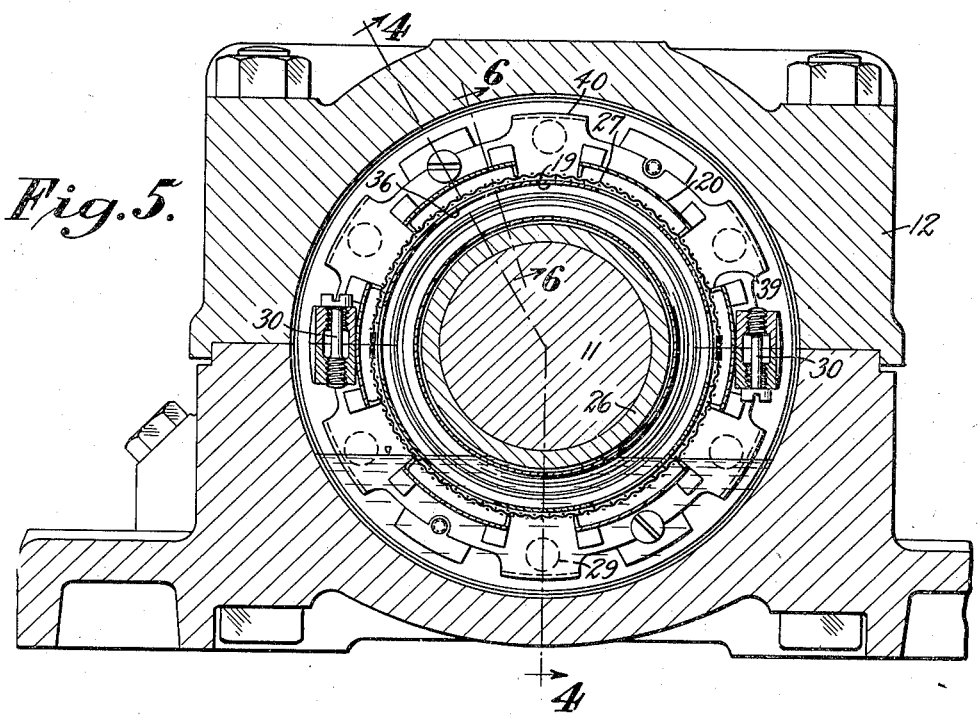
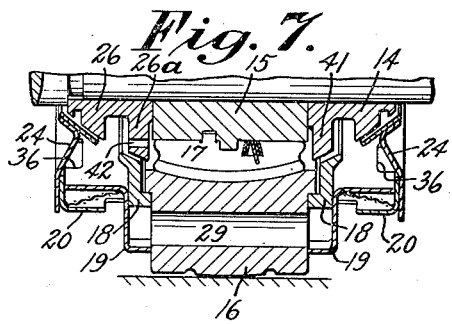
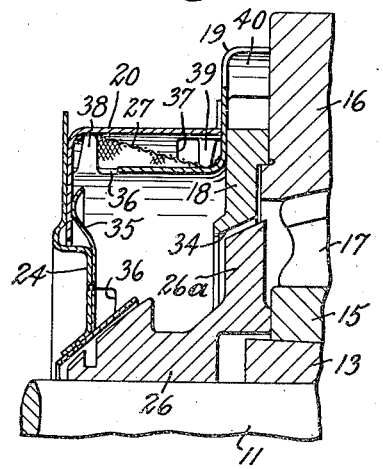
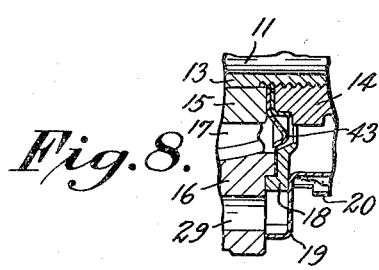

May 10, 1938.  A. G. F. WALLGREN ET AL  2,116,871
BEARING
Filed April 17, 1933  5 Sheets-Sheet 4
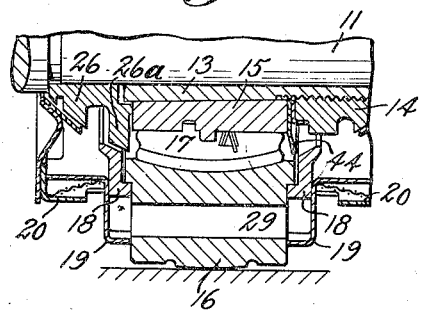
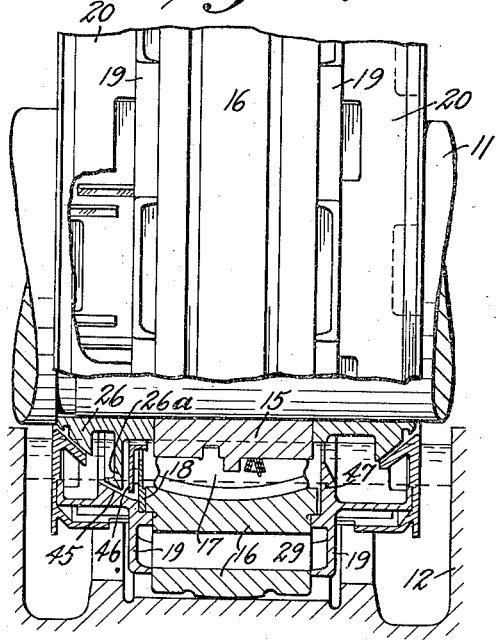
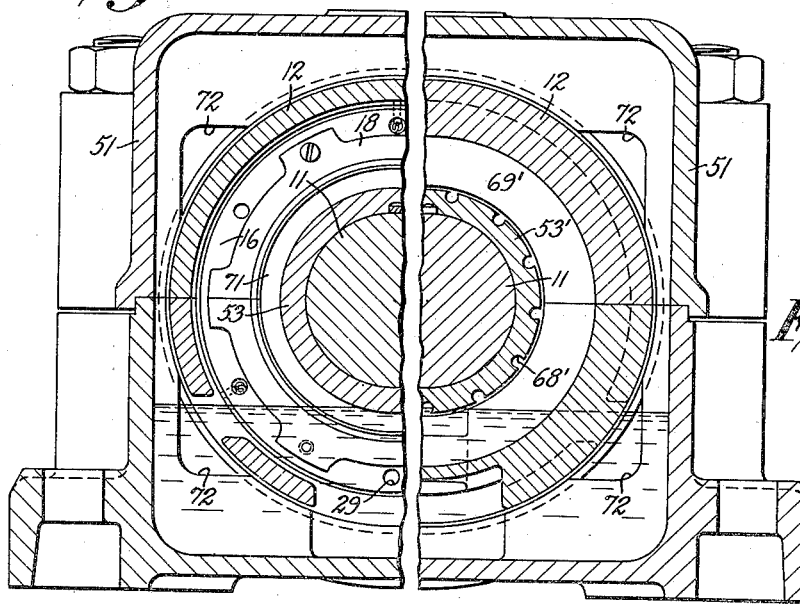
INVENTORS
BY
ATTORNEY

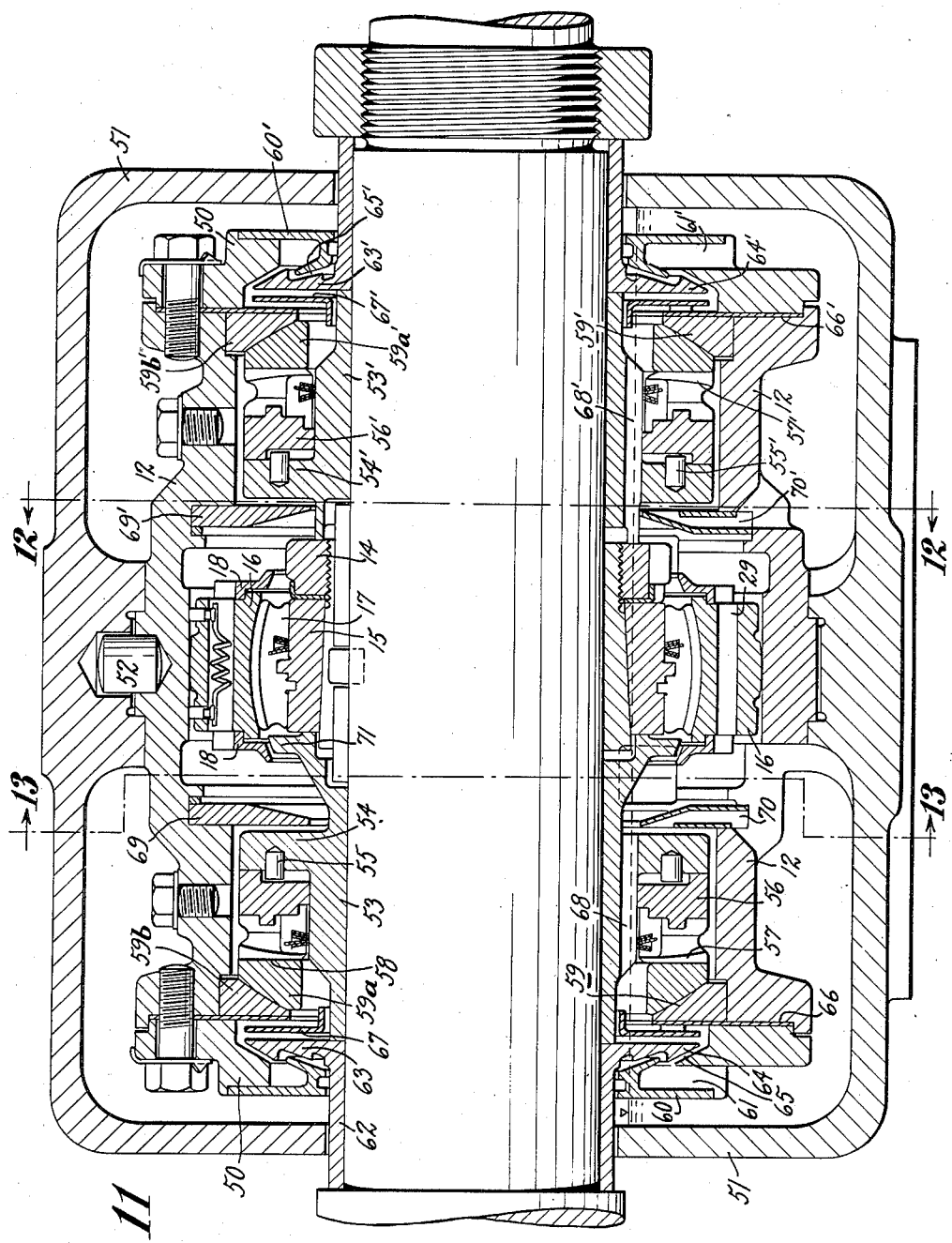

Patented May 10, 1938

2,116,871

UNITED STATES PATENT OFFICE 2,116,871

BEARING

August Gunnar Ferdinand Wallgren and Carl Gustaf Janson, Stockholm, Sweden, assignors to Aktiebolaget Nomy, Stockholm, Sweden, a corporation of Sweden Application April 17, 1933, Serial No. 666,492
In Sweden April 27, 1932

25 Claims. (Cl. 308—127)

Our invention relates to bearings and particularly to the lubrication of bearings.

More specifically, our invention relates to bearings adapted for use in connection with horizontal or inclined shafts. While our invention may be embodied in bearings of any type, such as ball or roller bearings, it is particularly well adapted for use in bearings having tiltable sliding blocks, such as are described in Patent No. 1,871,485 granted to A. G. F. Wallgren on August 16, 1932. In bearings of this type a plurality of tiltable blocks preferably having a spherical bearing surface slide with respect to a similar cooperating surface. Due to the fact that load transmission is between relative sliding surfaces of substantial area, rather than between points as in the case of a ball bearing, or lines as in the case of a roller bearing, these block bearings are capable of sustaining very great loads and hence are usually used for this purpose. In bearings of the block type, when operating, there is no direct contact between the relatively sliding surfaces, but load transmission is effected through a load sustaining wedge shaped film of lubricant formed between them. Due to the larger loads carried it is essential that such a film should be built up and therefore the proper lubrication of bearings of this type is exceedingly important.

In bearings for horizontal or inclined shafts having the usual reservoir for lubricant, only the lower part of the bearing dips into the reservoir. One of the objects of our invention is to provide means whereby the bearing surfaces around the entire circumference of the bearing are enveloped in a layer of lubricant during operation of the bearing. Another object of our invention is to provide adequate lubrication of a bearing which is independent of the total quantity of lubricant in the reservoir. A further object of our invention is to provide a bearing of the type in which lubrication is effected in accordance with the invention which may be installed in the field with as little difficulty as is possible.

Further objects and advantages of our invention will be apparent from the following description considered in connection with the accompanying drawings, which form a part of this specification and on which:

Fig. 2 is a view similar to Fig. 1, but of a different embodiment of our invention;

Fig. 3 is a cross-sectional view of a portion of a bearing similar to that shown in Fig. 2, showing a modification of the structure shown in Fig. 2;

Fig. 4 is a cross-sectional view of still another embodiment of our invention and taken on the line 4—4 of Fig. 5;

Fig. 5 is a cross-sectional view taken on the line 5—5 of Fig. 4;

Fig. 6 is a cross-sectional view on a larger scale taken on the line 6—6 of Fig. 5;

Fig. 7 is a cross-sectional view of a portion of a bearing comprising still another embodiment of our invention;

Figs. 8 and 9 are cross-sectional views of portions of bearings similar to that shown in Figs. 4 through 6, but embodying modifications;

Fig. 10 is a view partly in cross-section of still another embodiment of our invention;

Fig. 11 is a cross-sectional view of our invention embodied in a combined radial and thrust bearing;

Fig. 12 is a cross-sectional view of a portion of the bearing shown in Fig. 11 taken on the line 12—12 of Fig. 11; and Fig. 13 is a view similar to Fig. 12, but taken on the line 13—13 of Fig. 11.

Figure 1:
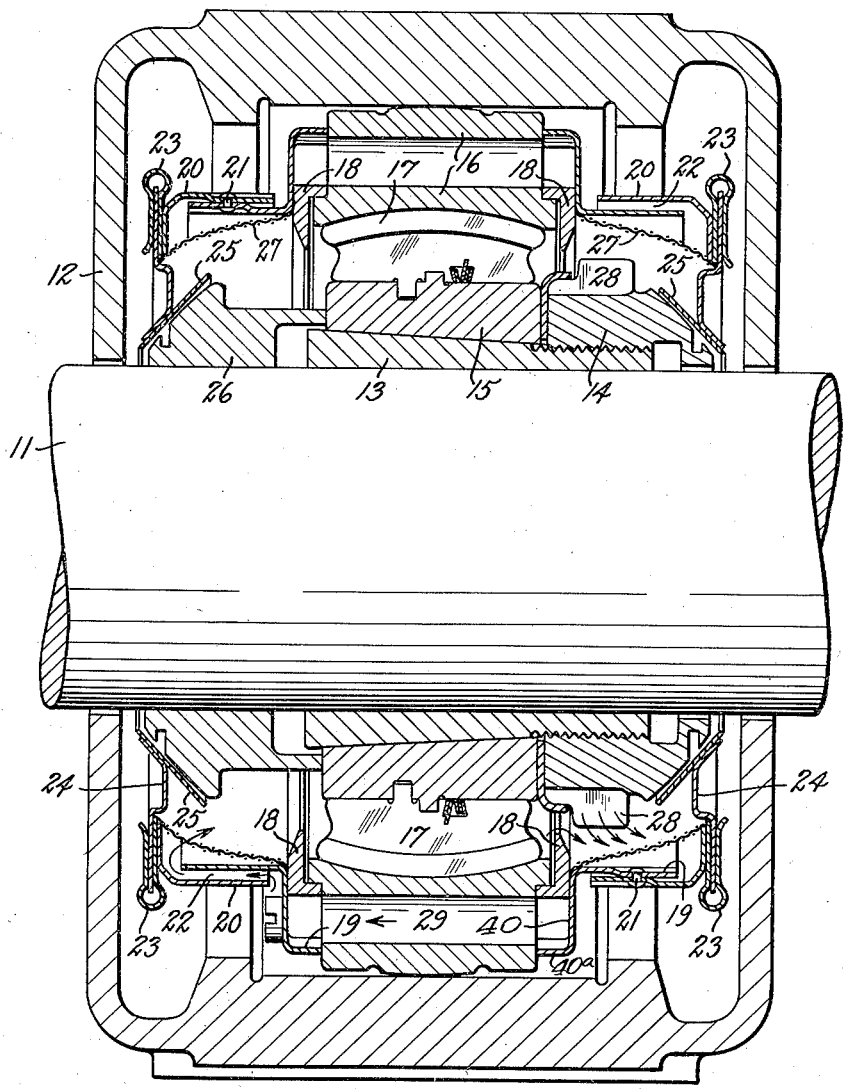
Fig. 1 is a cross-sectional view of one embodiment of our invention.

Referring more particularly to Fig. 1, reference character 11 designates a horizontal shaft. Shaft 11 extends within a housing 12 which is suitably mounted so as to be stationary and serves as an oil reservoir. Suitably secured to shaft 11 within housing 12 is a sleeve 13. A lock nut 14 threaded on to one end of sleeve 13 serves to rigidly secure an inner bearing ring 15 to the sleeve. Mounted within housing 12 concentrically with inner ring 15 is an outer bearing ring 16. The inner surface of ring 16 is spherical. Between rings 15 and 16 is situated a plurality of bearing members 17 which are formed with outer spherical surfaces adapted to slide on the spherical surface of ring 16. The inner surfaces of members 17 and the outer surface of ring 15 are irregular and cooperate to cause the members 17 to rotate with the ring 15 and to tilt slightly with respect thereto in order that wedge shaped films of lubricant may be formed between the spherical surfaces of members 17 and ring 16. One form of construction and the operation of this type of bearing is pointed out more in detail in the above-mentioned Patent No. 1,871,485. A portion of the outer surface of ring 16 is preferably formed as a portion of a sphere in order to permit in known manner a limited axial movement of the shaft without imposing axial thrust load on the bearing.

Suitably secured to either end of ring 16 are annular plate members 18. These members extend radially inwardly of ring 16 and, together with ring 16 form an annular space which includes the spherical bearing surface of ring 16 and members 17.

Also secured to ring 16 at either end thereof are ring-like hood members 19 which comprise cylindrical portions and annular portions. Members 19 are each preferably diametrically split into two semi-circular portions which may be joined together by means of bolts 30, as shown in Fig. 5. Secured to hood members 19 are additional ring-like and split hood members 20. Hood members 19 and 20 may be secured together by means of rivets 21. At points other than where rivets 21 secure the hood members together, there are formed channels 22 between cylindrical portions of the members. Hood members 20 are provided with suitable spring clips 23 which are adapted to receive annular end plates 24. Secured in the central openings of plates 24 are conically shaped members 25. Members 25 lie closely adjacent to a spherical surface on lock nut 14 and a member 26, respectively. Member 26 is secured to shaft 11 and abuts against ring 15.

A wire mesh screen 27 is arranged within the inner chambers formed at either end of the bearing by hood members 19, 20 and 24. Screens 27 are so arranged that lubricant passing to or from the inner chambers through passages 22 must pass through the screens. Lock nut 14 is provided with wings or the like 28 which extend further from the shaft in a radial direction than does any portion of member 26.

Housing 12 is initially filled with lubricant to such a height that wings 28 dip into the lubricant, but member 26 does not touch the lubricant. Upon rotation of shaft 11, bearing members 17 are caused to rotate with ring 15 and slide with respect to the stationary spherical surface of ring 16. Wings 28, dipping into the lubricant in the inner chamber at the right hand end of the bearing, throw this lubricant outwardly by centrifugal force which causes the withdrawal of lubricant from around the bearing surfaces. This lubricant passes through screen 27 and through passages 22 into the outer chamber in housing 12 outside of the hood members at the right hand end of the bearing. This causes an increase in the level of the lubricant in this end of the outer chamber and hence lubricant tends to flow to the other end of the housing through passages 29 extending through ring 16. From here the lubricant flows through passages 22 and screen 27 into the inner chamber at the left hand end of the bearing. It overflows through the central opening in annular plate 18 and thus is supplied to the bearing surface. The presence of annular plate 18 at the right hand end of the bearing prevents lubricant from leaving until the level is sufficiently high so that it may run out through the central opening therein. The result is that, when the bearing is rotating there is formed an annular ring or layer of lubricant around the entire circumference of the bearing, where it is retained due to centrifugal force. Thus it will be seen that members 18 constitute means for maintaining an annular layer of lubricant for the bearing surfaces. This annular layer of lubricant not only assures that the bearing will be lubricated around its entire circumference, but also that no air bubbles will be present at the bearing surfaces. Any air which becomes emulsified, so to speak, with the lubricant due to the agitation of the latter, will be forced to the inner surface of the annular layer and away from the bearing surfaces, because of the higher pressure existing at the radially outer surface of the layer caused by centrifugal force. The lubricant withdrawn from around the bearing surfaces by the rotation of wings 28 is taken from the radially inner surface of this annular layer, and hence the so-called emulsion of air and oil is continuously removed from the neighborhood of the bearing surfaces. Also, inasmuch as the bearing members 17 rotate with the annular layer of lubricant, instead of through a more or less stationary body of lubricant, the latter is not agitated violently, and hence there is not the tendency for the lubricant to become emulsified.

In order to prevent the return of the emulsion of air and oil from the right-hand side of the bearing to the left side, as viewed in Fig. 1 for instance, hood members 19 are provided with guard portions 40 which extend in front of passages 29 and are formed with lips 40a which contact ring 16 radially outwardly of the passages. An end view of this structure is shown in the embodiment illustrated in Fig. 5 where the guard portions are indicated by reference character 40. In order for oil to flow through passages 29 it must first flow around the ends of guard portions 40. This has no appreciable effect on the flow through the passage 29 at the bottom of the ring, or any other passage which is wholly below the level of the lubricant. However, in the case of the two passages 29 shown in Fig. 5 to be right at the liquid level, the oil must flow around the lower submerged ends of the portions 40. Hence, the emulsion, which floats on the liquid surface, is not admitted to the passages, but is retained in the outer right-hand chamber and cannot get to the bearing surfaces. Any emulsion which may get by the guard portions 40 at the right ends of the passages is prevented from leaving the passages by the guard portions 40 at the other end.

Conical members 25 in conjunction with the spherical surfaces on nut 14 and member 26 serve to prevent lubricant reaching shaft 11 and following the shaft out of the housing. Any lubricant splashed up on nut 14 or member 26 will not tend to flow toward the outside of the housing, but will be thrown off due to centrifugal force at the places of greatest diameter of these parts. The spherical surfaces of nut 14 and member 26 are struck about a point at the center of the bearing so that they will not contact members 25 if the shaft moves slightly about this point to align itself.

The bearing just described is similar in some respects to the bearing shown in copending application Serial No. 639,402, filed October 25, 1932, by A. G. F. Wallgren.

The bearing shown in Fig. 2 is similar to that shown in Fig. 1 with the exception that the wings 28 on lock nut 14 are omitted and the central aperture in one plate member 18 has a different diameter than that in the other plate member. Due to the fact that these apertures are of different diameter, the annular ring of lubricant built up between them tends to have a greater thickness at the left hand end of the bearing than at the right hand end, as viewed in Fig. 2, and as is shown by the dotted line in this figure. This results in an unstable condition of the layer of lubricant and flow takes place from the left hand end of the bearing to the right hand end. Thus, it is not necessary to provide wings 28 for causing flow.

In the bearing shown in Fig. 2 lubricant will be splashed on to member 26 from which it will be thrown due to centrifugal force in a direction indicated by the arrows 31. It will be seen that this lubricant tends to interfere with the flow of lubricant through the inner chamber, which latter flow is in the direction indicated by the arrow 32. In Fig. 3 we have shown a slight modification, the purpose of which is to overcome the above tendency. An annular ring 33 is secured to and spaced from the annular plate 18 which has the smaller aperture (the plate at the left, as viewed in Figs. 2 and 3). With this arrangement, the lubricant supplied through the central aperture in plate 18 passes from the radially outer part of the inner chamber formed by hoods 19 and 20, between plate 18 and ring 33. Hence, the effect of the lubricant thrown off from member 26, which strikes the surface of the lubricant in the inner chamber, is not adverse to the flow of lubricant to the bearing surface.

In the bearing shown in Figs. 4 through 6, the central opening in each plate 18 is formed conically with its greater diameter on the side of the plate adjacent to rings 15 and 16, as is clearly shown at 34. Member 26 is formed with a radial flange portion 26a which has a conical surface spaced slightly from, and parallel to, the conical surface 34. The edge of flange 26a having the greater diameter is inside of a portion of the bearing surface of ring 16. Also, in this figure the detailed construction of the members 19, 20, and 24, forming the inner chambers at either end of the bearing is modified somewhat. Spring clips 35 are secured to end plates 24, which clips engage hood members 20. The method of securing screens 27 in place is clearly shown in Fig. 6. Hood member 19 is provided with apertures 36 spaced around its periphery while hood member 20 is provided with apertures 37. Apertures 36 and 37 are preferably arranged in staggered relationship with respect to each other, both peripherally and axially, in order to prevent direct passage therethrough of drops of lubricant thrown off from the rotating parts. A portion of the material struck out to form apertures 36 and 37 is retained and bent to form lips 38 and 39, respectively. These lips are bent so as to clamp the screen 27 between them and the hood members. Hood member 19 is formed with portions 40 which form guards over the passages 29 formed in ring 16. These guards do not close the passages 29 but tend to prevent the passage through the passages 29 of air emulsified with lubricant, as previously described.

Upon rotation of the shaft 11 of the bearing shown in Figs. 4 to 6, member 26 is caused to rotate and, due to centrifugal force, lubricant is thrown radially outwardly from the conical edge thereon. This lubricant strikes the conical surface 34 of plate 18 or the bearing surface of ring 16 and is caused to pass into the annular space between plates 18. This lubricant forms an annular ring or layer due to centrifugal force, which ring or layer extends around the entire periphery of the bearing and assures adequate lubrication. As the lubricant is forced into this space by flange 26a cooperating with surface 34 it overflows to the central aperture in plate 18 at the right hand end of the bearing. From here the lubricant passes through the passageway between hood members 19 and 20 in which passageway is arranged the screen 27. The lubricant then passes through passages 29 in outer ring 16 to the left hand end of the housing 12. From here it flows through the passageway between hood members 19 and 20 to be again forced into the annular space between plates 18. It is not essential for the operation of the bearing that the plate 18 on the right hand end of the bearing as viewed in Fig. 4 be formed with a conical aperture. However, for the sake of uniformity in manufacturing, it is preferable to have both of the plates identical. This also makes it impossible to assemble the bearing incorrectly as it makes no difference which plate is placed at either end of the bearing.

In the embodiment shown in Fig. 7 means are provided for causing lubricant to enter the annular space between the plates 18 from both ends of the bearing. For this purpose lock nut 14 is provided with a projection 41 which is similar to projection 26a on member 26 and which cooperates with the conical aperture in plate 18 in the same manner. This makes it possible to completely fill with lubricant during operating periods the space between rings 15 and 16. In order that air may escape from this space when lubricant is forced in from both ends, one or both of the projections 26a and 41 is or are provided with apertures 42. This also allows a certain amount of circulation of the lubricant which is desirable in order that heat may be carried away from the bearing surfaces.

In the modification shown in Fig. 8, the projection 41 which is shown in Fig. 7 as integral with lock nut 14, is replaced by a disc 43 which is formed so as to have a conical outer rim. The operation of this modification is in all respects similar to that shown in Fig. 7.

In the bearing shown in Fig. 9, an annular disc 44 is arranged at the right hand end of the bearing, as viewed in this figure. The purpose of this disc is to retard the flow of lubricant through the bearing. Under certain conditions, the flow caused by, for instance the projection 26a in conjunction with the plate 18 may be so rapid as to lower the level of the lubricant in one end of housing 12 to such an extent that sufficient lubricant is not supplied to the bearing. Also, the level of the lubricant in the other end of the housing may be raised to such an extent that it contacts the shaft, whereupon leakage will occur along the shaft. The presence of plate 44 retards the rate of flow of lubricant through the bearing and thus eliminates the above objection.

In the embodiment shown in Fig. 10 the projection 26a on the member 26 acts in cooperation with a conical surface 45 formed on hood member 19, instead of in conjunction with a conical surface formed on plate member 18. This makes it possible to increase the diameter of projection 26a so that it will dip into the lubricant when the latter is at a lower level than when the projection is as shown, for instance, in Fig. 4. In this modification the plate member 18 at the left end of the bearing, as shown in Fig. 10, is provided with an annular ring 46 spaced therefrom so as to form radial passageways therebetween. The flow of lubricant set up by the rotation of projection 26a is through the passage between plate member 18 and ring 46 into the annular space occupied by the bearing members 17. Instead of having a separate annular plate member at the other end of the bearing, a projection 47 is formed on hood member 19 and serves the same purpose as plate member 18 at the right hand end of the bearing shown in, for instance, Fig. 4.

The bearing shown in Figs. 11 through 13 comprises a combination radial and thrust bearing. The radial load portion of the bearing, which occupies the central portion of the structure is similar to the radial bearing shown in Figs. 4 to 6. However, the housing 12 is extended axially of the radial bearing portion and is provided at its ends with closure plates 50. The thrust bearing portions are enclosed within the axial extensions of housing 12. Housing 12 itself is enclosed in an outer casing 51 and is prevented from rotating therein by means of pin 52. The inner ring 15 of the radial bearing portion is secured to the shaft 11 by means of the sleeve 13 and nut 14, while the outer ring 16 is mounted in the housing 12. Bearing members 17 are located between rings 15 and 16.

Suitably secured to shaft 11 to the left of the radial bearing portion, as viewed in Fig. 11, is a sleeve 53 provided with a radial flange 54. Secured to flange 54 by means of pins 55 is the rotating ring 56 of the left hand thrust bearing (as viewed in Fig. 11). Ring 56 carries bearing members 57 which are formed with bearing surfaces 58. These surfaces slide with respect to a cooperating radial surface formed on the part 59a of a two part thrust ring 59. Part 59b of the thrust ring is clamped in the extension of housing 12 by member 50, and the parts 59a and 59b have cooperating spherical surfaces permitting self-aligning movement between the parts.

Secured to closure member 50 is an end plate 60. A series of radial passageways 61 are formed between plates 60 and cover members 50. Secured to the shaft 11 adjacent end plates 60 is a sleeve 62 formed with a radial projection 63 which has a conical surface 64. Cover member 50 is formed with a cooperating conical surface 65. An annular disc 66 is clamped between housing 12 and cover member 50 and may serve as a packing. Disc 66 extends radially inwardly and supports another annular disc 67. Discs 66 and 67 are spaced apart to form radial passageways therebetween. Axial passageways 68 are formed through sleeve 53. An annular disc 69 is secured to housing 12 between projection 54 and the radial bearing portion. Disc 69 is provided with a plurality of radially extending passageways 70 which establish communication between the thrust bearing and the outside of housing 12.

The thrust bearing shown on the right, as seen in Fig. 11, of the radial bearing is similar to that shown on the left and corresponding parts are designated by similar reference characters with primes added.

Sleeve 53 is provided with a radial projection 71 which corresponds to projection 26a on member 26, shown in Fig. 4. Annular plates 18 are secured to either end of outer ring 16, likewise as in Fig. 4.

Upon rotation of the shaft 11, the circulation of lubricant through the bearing shown in Figs. 11 through 13, is as follows:

Lubricant is thrown from the conical surface 64 of radial projection 63, due to centrifugal force, and passes through the passageway between annular discs 66 and 67. From here it is supplied to the sliding surfaces of the left hand thrust bearing members and the annular space bounded by discs 66 and 67 at one end and by disc 69 at the other end is maintained full of lubricant. This lubricant travels through passage 68 and is discharged through the central aperture in disc 69 and is picked up by the rotating radial projection 71 and forced into the annular space within the radial bearing portion bounded at the ends by plates 18. The lubricant flows out through the central aperture in plate 18 at the right hand end of the radial bearing portion where it joins lubricant discharged through passage 68' from the right hand thrust bearing. Lubricant is supplied to the right hand thrust bearing by the rotating radial projection 63' which causes it to pass between the annular discs 66' and 67'. The lubricant discharged from the right hand end of the radial bearing portion and the left hand end of the right hand thrust bearing passes from within housing 12 through apertures formed therein between disc 69' and the radial bearing portion. From here the lubricant may pass to the other end of casing 51 through the apertures 72, clearly shown in Figs. 12 and 13.

Passages 70 in disc 69 are provided for the purpose of assuring that lubricant will be present in the thrust bearings during periods of rest, so that it will be available for lubrication when the bearing first starts to rotate and before circulation of lubricant is set up.

While we have shown several embodiments of our invention, it is to be understood that these are for purposes of illustration only, and that our invention is not to be limited thereby, but its scope is to be determined by the appended claims viewed in the light of the prior art.

What we claim is:

1. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate secured to each end of said second ring and extending radially inwardly for maintaining between the rings and during rotation of said shaft an annular layer of lubricant for lubricating the bearing surfaces of said members, the central opening in one of said annular plates having a different diameter than that in the other, both of said openings communicating with the interior of said reservoir.

2. A bearing comprising a housing, a bearing unit in said housing comprising a stationary member, a rotary member and load transmitting members therebetween having bearing surfaces, hoods on each side of said unit in said housing providing inner and outer chambers on each side and a communication between each chamber on each side, means arranged at either side of said unit and within said inner chambers for maintaining between the rings and during rotation of said rotary member an annular layer of lubricant for lubricating the bearing surfaces of said members, and means for providing a higher lubricant level in one of said inner chambers than in the adjacent outer chamber and a higher lubricant level in said one of said inner chambers than in the other of said inner chambers, whereby lubricant is fed from said one of said inner chambers through said outer chamber to said other of said inner chambers and thence to said layer.

3. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at either side of said rings for maintaining between said rings and during rotation of said shaft an annular layer of lubricant for lubricating the bearing surfaces of said members, the central opening in one of said annular plates being developed as a conical flange with its greatest diameter on the side of said plate adjacent to said rings, and a radial flange mounted on said shaft and having a conical periphery spaced from and parallel to said conical flange whereby lubricant is fed to the space between said annular plates, and the central opening in the other of said annular plates being sufficiently unobstructed so that lubricant flows out therethrough.

4. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate secured to each end of said second ring and extending radially inwardly for maintaining between said rings and during rotation of said shaft an annular layer of lubricant for lubricating the bearing surfaces of said members, the central opening in one of said annular plates being developed as a conical flange with its greatest diameter on the side of said plate adjacent to said rings, and a radial flange mounted on said shaft and having a conical periphery spaced from and parallel to said conical flange whereby lubricant is fed to the space between said annular plates, and the central opening in the other of said annular plates being sufficiently unobstructed so that lubricant flows out therethrough.

5. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring and having an inner spherical bearing surface, bearing members between said rings having spherical bearing surfaces, an annular plate arranged at either side of said rings for maintaining between said rings and during rotation of said shaft an annular layer of lubricant for lubricating said bearing surfaces, the central opening in one of said annular plates being developed as a conical flange with its greatest diameter on the side of said plate adjacent to said rings, and a radial flange mounted on said shaft and having a conical periphery spaced from and parallel to said conical flange, the side of said radial flange having the greatest diameter being inside of said second ring for throwing lubricant radially outwardly due to centrifugal force against the bearing surface of said second ring between said annular plates, and the central opening in the other of said annular plates being sufficiently unobstructed so that lubricant flows out therethrough.

6. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at either side of said rings for maintaining between said rings and during rotation of said shaft an annular layer of lubricant for lubricating the bearing surfaces of said members, the central openings in said annular plates being developed as conical flanges with their greatest diameters on the sides of said plates adajacent to said rings, and radial flanges mounted on said shaft and having conical peripheries spaced from and parallel to said conical flanges, one of said radial flanges being formed with passages therethrough.

7. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at either side of said rings for maintaining between said rings and during rotation of said shaft an annular layer of lubricant for lubricating the bearing surfaces of said members, the central opening in one of said annular plates being developed as a conical flange with its greatest diameter on the side of said plate adjacent to said rings, and a disc secured to said shaft and having its periphery flanged to form a cone spaced from and parallel to said conical flange whereby lubricant is fed to the space between said annular plates, and the central opening in the other of said annular plates being sufficiently unobstructed so that lubricant flows out therethrough.

8. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at either side of said rings for maintaining between said rings and during rotation of said shaft an annular layer of lubricant for lubricating the bearing surfaces of said members, the central opening in one of said annular plates being developed as a conical flange with its greater diameter on the side of said plate adjacent to said rings, a disc secured to said shaft and having its periphery flanged to form a cone spaced from and parallel to said conical flange whereby lubricant is fed to the space between said annular plates, and a second disc secured to said shaft and extending radially to adjacent to the other of said annular plates for reducing the effective cross-sectional area of the central opening therein to retard the outflow of lubricant therethrough.

9. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at either side of said rings for maintaining between said rings and during rotation of said shaft an annular layer of lubricant for lubricating the bearing surfaces of said members, means for causing flow of lubricant to said layer through the central opening in one of said annular plates, and an annular ring spaced axially from said one of said plates on the side thereof remote from said rings for forming, with said plate, an annular channel to guide said flow of lubricant.

10. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, bearing members between said rings having bearing surfaces, an annular plate arranged at one side of said rings for retaining between said rings and during rotation of said shaft an annular layer of lubricant of a thickness to form an air free outer portion for lubricating the bearing surfaces of said members, an annular member having an axial portion and a radial portion arranged at the other side of said rings, a conical surface formed on the inside of said axial portion with its greatest diameter adjacent to said rings, a radial flange mounted on said shaft and having a conical periphery spaced from and parallel to said conical surface, and a pair of axially spaced annular rings between said radial flange and said rings, said pair of annular rings forming between them a radial passage for flow of lubricant to said annular layer, and a central opening in said annular plate providing a path for flow of lubricant from said layer.

11. A bearing comprising a housing, a bearing unit in said housing comprising a stationary member, a rotary member and load transmitting members therebetween having bearing surfaces, hoods on each side of said unit in said housing comprising radial portions and axial portions and providing inner and outer chambers on each side and a communication between each chamber on each side, a part of the radial portion on one of said hoods forming an annular plate at one side of said unit for retaining between said stationary member and said rotary member and during rotation of said rotary member an annular layer of lubricant of a thickness to form an air free outer portion for lubricating said bearing surfaces, a conical surface being formed on the inside of an axial portion of the other hood, said surface having its greatest diameter adjacent to said unit, a radial flange adapted to rotate with said rotary member and having a conical periphery spaced from and parallel to said conical surface, and a pair of axially spaced annular rings between said radial flange and said unit, said pair of annular rings forming between them a radial passage for flow of lubricant to said annular layer, and the central opening in said annular plate providing a path for flow of lubricant from said layer.

12. In a bearing for a rotatable shaft, a housing surrounding a portion of said shaft and adapted to form a reservoir for lubricant, a first ring fixed to said shaft within said housing for rotation therewith, a second ring disposed within said housing adjacent to said first ring, bearing members between said rings having bearing surfaces, and annular plates arranged at either side of said rings for maintaining between said rings and during rotation of said shaft an annular layer of lubricant for lubricating the bearing surfaces of said members, one of said plates being formed with radially extending lubricant feed channels.

13. In a bearing for a shaft, a housing surrounding a portion of said shaft, a first radial ring secured to said shaft within said housing, a second radial ring having sliding bearing surface fixed within said housing and spaced axially from said first ring, bearing members carried in rotation by said first ring and having sliding bearing surfaces cooperating with the surface on said second ring, means arranged at either side of said rings for maintaining between said rings and during rotation of said shaft a rotating annular layer of lubricant comprising an air-free outer portion and an air-containing foam-like inner portion, the air-free outer portion serving to lubricate the bearing surfaces of said members, and means for causing flow of lubricant by centrifugal force to and from said layer to displace said inner portion.

14. In a bearing for a shaft, a housing surrounding a portion of said shaft, a first radial ring secured to said shaft within said housing, a second radial ring fixed within said housing and spaced axially from said first ring, bearing members between said rings having bearing surfaces, and annular plates arranged at either side of said rings for maintaining between said rings and during rotation of said shaft an annular layer of lubricant for lubricating the bearing surfaces of said members, one of said plates being provided with radially extending lubricant feed channels.

15. In a bearing for a rotatable shaft, a housing surrounding a portion of said shaft and adapted to form a reservoir for lubricant, a first ring fixed to said shaft within said housing for rotation therewith, a second ring disposed within said housing adjacent to said first ring, load transmitting members between said rings and carried in rotation by said first ring, said members comprising blocks arranged to tilt to provide wedge-shaped spaces between said blocks and said second ring for the formation therein of load sustaining films of lubricant, means for maintaining between said rings and during rotation a rotating annular layer of lubricant comprising an air-free outer portion and an air-containing foam-like inner portion, and means for continuously renewing said layer by circulating lubricant by centrifugal force from said housing to said layer and from said layer to said housing.

16. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, load transmitting members between said rings and carried in rotation by said first ring, said members comprising blocks arranged to tilt to provide wedge-shaped spaces between said blocks and said second ring for the formation therein of load sustaining films of lubricant, an annular plate arranged at each end of said second ring and extending radially inwardly for maintaining between the rings and during rotation a rotating annular layer of lubricant comprising an air-free outer portion and an air-containing foam-like inner portion, said plates having openings disposed at least in part below the level of the lubricant in said reservoir, and means for continuously renewing said layer by circulating lubricant through said openings by centrifugal force from said housing to said layer and from said layer to said housing.

17. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, load transmitting members between said rings and carried in rotation by said first ring, said members comprising blocks arranged to tilt to provide wedge-shaped spaces between said blocks and said second ring for the formation therein of load sustaining films of lubricant, an annular plate arranged at each end of said second ring and extending radially inwardly for maintaining between the rings and during rotation a rotating annular layer of lubricant comprising an air-free outer portion and an air-containing foam-like inner portion, the central opening in one of said plates being developed as a conical flange with its greatest diameter on the side of said plate adjacent to said rings, and a radial flange mounted on said shaft and having a conical periphery spaced from and parallel to said conical flange whereby lubricant is fed to the space between said annular plates, and the central opening in the other of said annular plates being sufficiently unobstructed so that lubricant flows out therethrough.

18. In a bearing of the character described, a rotatable inner ring, a stationary outer ring, and load transmitting members therebetween carried in rotation by one of said rings, said members and the other of said rings having spherical sliding bearing surfaces, concentric members arranged at one side of said rings and having conical edges spaced closely apart to form a conical space, one of said concentric members being rotatable with said inner ring for supplying oil through said space to the bearing, said edges being tangent to spheres concentric with said spherical bearing surfaces and an annular plate arranged at the other side of said rings for retaining the oil supplied through said space in contact with said bearing surfaces in the form of an annular layer.

19. In a bearing for a rotatable shaft, a housing surrounding a portion of said shaft and adapted to form a reservoir for lubricant, a first bearing means fixed to said shaft within said housing for rotation therewith, a second bearing means disposed within said housing adjacent to said first bearing means, said first and second bearing means having cooperating sliding bearing surfaces, means arranged at either side of said surfaces for maintaining radially inside said bearing surfaces and during the rotation of said shaft a rotating annular layer of lubricant of a thickness to form an air-free outer portion for lubricating said bearing surfaces, and means for causing flow of lubricant from said reservoir to said layer and from said layer to said reservoir to continuously renew said layer.

20. In a bearing for a rotatable shaft, a housing surrounding a portion of said shaft and adapted to form a reservoir for lubricant, a first annular bearing means fixed to said shaft within said housing for rotation therewith, a second annular bearing means disposed within said housing concentric with said first bearing means, said first and second bearing means having cooperating sliding bearing surfaces, an annular plate disposed at either end of said second bearing means and extending radially inwardly for maintaining between the bearing means and during the rotation of said shaft a rotating annular ring of lubricant of a thickness to form an air-free outer portion for lubricating said bearing surfaces, said plates having openings disposed at least in part below the level of the lubricant in said reservoir, and means for causing flow of lubricant through said openings by centrifugal force from said reservoir to said layer and from said layer to said reservoir to continuously renew said layer.

21. In a bearing for a substantially horizontal shaft, a housing surrounding a portion of said shaft and adapted to form a lubricant reservoir below said shaft, means including sliding bearing surface carried by said shaft for rotation therewith within said housing, a rotationally stationary bearing member within said housing and having sliding bearing surface cooperating with the first mentioned bearing surface, stationary elements disposed on both sides of said bearing surfaces and extending radially inwardly beyond said surfaces for maintaining during rotation of said shaft a rotating annular layer of lubricant having an air free outer portion for lubricating said surfaces, said elements being formed with an aperture for admitting lubricant from said reservoir to said layer and a separate aperture for admitting air-containing lubricant foam, formed by the agitation of the lubricant, from the space between said elements to said reservoir, and means for causing flow through said apertures.

22. In a bearing for a substantially horizontal shaft, a housing surrounding a portion of said shaft and adapted to form a lubricant reservoir below said shaft, means including sliding bearing surface carried by said shaft for rotation therewith within said housing, a rotationally stationary bearing member within said housing and having sliding bearing surface cooperating with the first mentioned bearing surface, stationary elements disposed on both sides of said bearing surfaces and extending radially inwardly beyond said surfaces for maintaining during rotation of said shaft a rotating annular layer of lubricant having an air free outer portion for lubricating said surfaces, said elements being formed with an aperture for admitting lubricant from said reservoir to said layer and a separate aperture for admitting air-containing lubricant foam, formed by the agitation of the lubricant, the first mentioned aperture being disposed at least in part below the level of the lubricant in said reservoir, and means for causing flow by centrifugal force through said first mentioned aperture.

23. In a bearing for a rotatable shaft, a housing surrounding a portion of said shaft and adapted to form a reservoir for lubricant, a first ring fixed to said shaft within said housing for rotation therewith, a second ring disposed within said housing concentric with said first ring, said second ring having a bearing surface, an annular plate disposed at either side of said second ring and extending radially inwardly for maintaining radially inside said bearing surface and during the rotation of said shaft a rotating annular ring of lubricant of a thickness to form an air free outer portion for lubricating said bearing surface, means for causing a continuous flow of lubricant from said reservoir to said layer and from said layer to said reservoir, and means disposed below the oil level of said reservoir for equalizing the height of the same at either side of the bearing.

24. In a bearing for a substantially horizontal shaft adapted to be mounted in a housing forming a reservoir for lubricant, sliding bearing means carried in rotation by said shaft within said housing, and cooperating sliding bearing means mounted against rotation in said housing, the combination therewith of means for preventing agitation of the main body of lubricant in said reservoir by the first mentioned bearing means including inner and outer partitioning members mounted against rotation in said housing on either side of said bearing means, said inner members being spaced apart to provide an inner chamber enclosing said bearing means, said outer members being spaced from said inner members to provide intermediate chambers and being spaced from said housing to provide outer chambers, said partitioning members being provided with openings therethrough for the circulation of lubricant between said chambers.

25. In a bearing for a substantially horizontal shaft adapted to be mounted in a housing forming a reservoir for lubricant, sliding bearing means carried in rotation by said shaft within said housing, and cooperating sliding bearing means mounted against rotation in said housing, the combination therewith of inner and outer partitioning members mounted against rotation in said housing on either side of said bearing means, the inner members being located adjacent to either side of said bearing means and extending radially inwardly beyond the cooperating bearing surfaces for maintaining during rotation an annular layer of lubricant comprising an air-free outer portion and an air-containing foam-like inner portion, the outer members being spaced from said inner chambers to form intermediate chambers and being spaced from said housing to provide outer chambers, said inner and outer members being provided with openings therethrough for the circulation of lubricant, said inner chambers serving to confine violent agitation of lubricant to the space between them, and said outer members serving to prevent substantial agitation of lubricant in said outer chambers.

AUGUST GUNNAR FERDINAND
     WALLGREN.
CARL GUSTAF JANSON.